(12) United States Patent
Harris

(10) Patent No.: US 10,266,245 B2
(45) Date of Patent: Apr. 23, 2019

(54) FOLDING HEAVY-LIFT UNMANNED AERIAL VEHICLE FRAME

(71) Applicant: Benjamin Harris, Orlando, FL (US)

(72) Inventor: Benjamin Harris, Orlando, FL (US)

(73) Assignee: Harris Aerial LLC, Casselberry, FL (US)

( * ) Notice: Subject to any disclaimer, the term of this patent is extended or adjusted under 35 U.S.C. 154(b) by 232 days.

(21) Appl. No.: 15/265,948

(22) Filed: Sep. 15, 2016

(65) Prior Publication Data
US 2017/0291677 A1 Oct. 12, 2017

Related U.S. Application Data

(60) Provisional application No. 62/318,918, filed on Apr. 6, 2016.

(51) Int. Cl.
B64C 1/06 (2006.01)
B64C 39/02 (2006.01)

(52) U.S. Cl.
CPC ............ *B64C 1/061* (2013.01); *B64C 39/024* (2013.01); *B64C 2201/128* (2013.01)

(58) Field of Classification Search
CPC .. B64C 1/061; B64C 39/024; B64C 2201/128
See application file for complete search history.

(56) References Cited

U.S. PATENT DOCUMENTS

| 7,979,960 B2 | 7/2011 | Sano et al. | |
| 2012/0083945 A1* | 4/2012 | Oakley | B64C 27/08 |
| | | | 701/2 |
| 2015/0259066 A1* | 9/2015 | Johannesson | B64C 27/08 |
| | | | 244/17.27 |
| 2015/0321755 A1* | 11/2015 | Martin | B64C 27/50 |
| | | | 244/17.23 |
| 2015/0321758 A1* | 11/2015 | Sarna, II | G05D 1/0011 |
| | | | 244/63 |
| 2016/0122016 A1* | 5/2016 | Mintchev | B64C 39/024 |
| | | | 244/17.23 |
| 2016/0152316 A1* | 6/2016 | Wang | B64C 39/028 |
| | | | 244/120 |
| 2016/0167776 A1* | 6/2016 | Shaw | B64C 27/20 |
| | | | 244/7 R |
| 2016/0325834 A1* | 11/2016 | Foster | B64C 39/024 |
| 2016/0339789 A1* | 11/2016 | Wang | B60L 11/1822 |
| 2016/0376004 A1* | 12/2016 | Claridge | B64C 19/00 |
| | | | 701/3 |
| 2017/0085840 A1* | 3/2017 | Mizushina | H04N 5/2257 |

(Continued)

*Primary Examiner* — Timothy D Collins
*Assistant Examiner* — Tye William Abell
(74) *Attorney, Agent, or Firm* — Jason T. Daniel, Esq.; Daniel Law Offices, P.A.

(57) ABSTRACT

A heavy-lift UAV frame includes a central frame portion having a symmetrical shape and forming a pocket area for receiving an avionics package. Top and bottom plates are secured to the central frame portion and include four corner members that extend diagonally outward therefrom. A plurality of boom arms are pivotally connected to the corner members and transition between an extended position for flight and a retracted position for storage and transport. Each boom arm includes a complementary dimension to one side of the central frame portion and is arranged parallel thereto when in the retracted position.

10 Claims, 6 Drawing Sheets

(56) References Cited

U.S. PATENT DOCUMENTS

| | | | | |
|---|---|---|---|---|
| 2017/0158328 A1* | 6/2017 | Foley | ................... | B64C 39/028 |
| 2017/0203843 A1* | 7/2017 | Chan | ....................... | B64D 1/08 |
| 2017/0267334 A1* | 9/2017 | Tsai | ......................... | G06T 7/11 |
| 2018/0002023 A1* | 1/2018 | Tian | ...................... | B64D 33/08 |
| 2018/0016027 A1* | 1/2018 | Cheatham, III | ....... | B64D 45/00 |

* cited by examiner

FOLDING HEAVY-LIFT UNMANNED AERIAL VEHICLE FRAME

CROSS-REFERENCE TO RELATED APPLICATIONS

This application claims the benefit of U.S. Application Ser. No. 62/318,918 filed on Apr. 6, 2016, the contents of which are incorporated herein by reference.

TECHNICAL FIELD

The present invention relates generally to aerial vehicles, and more particularly to a folding frame for a heavy-lift UAV.

BACKGROUND

The statements in this section merely provide background information related to the present disclosure and may not constitute prior art.

An unmanned aerial vehicle (UAV) is a heavier-than-air flying machine that does not carry a human operator. UAV's are utilized for many different military and civilian applications such as reconnaissance, surveillance, area mapping, and/or photography, for example.

Traditionally, the use and implementation of hobby grade vertical takeoff and landing UAV's was severely limited by the relatively low lifting capacity of the same. However, recent advancements have seen the introduction of small size UAV engines which can carry payloads exceeding 30-50 pounds each, and for prolonged periods of time. As such, UAV's are now being contemplated for use in new industries, and for performing tasks never before possible. Several examples include equipping a heavy-lift UAV with an agricultural spraying module, LIDAR remote sensing equipment, or a payload basket for transporting goods from one location to another.

Although such applications are promising, the current design and construction of UAV frames is not conducive for heavy-lift applications. This is because traditional UAV frames are constructed from an elongated, generally rectangular main body onto which the payload is secured. A plurality of elongated fixed booms having an engine along the distal ends are secured onto each corner of the main body and extend diagonally outward therefrom. The length of the elongated booms depends on the lifting capacity of the UAV, but typical designs call for a boom length that is approximately twice as long as the length of the main body itself.

Unfortunately, when such UAV frames are paired with heavy payloads, i.e., payloads that require engine thrust levels at or above 40%, these long booms have a tendency to vibrate during flight. These vibrations often increase over time, and can affect the ability for the device to be stable in flight. Moreover, these vibrations combined with the non-symmetrical shape of the main body make it difficult to secure payload at the center of mass of the device. Such weight management issues therefore result in less than optimal flight characteristics, and have been the cause of several crashes. Finally, owing to the large fixed shape of such vehicles, it is exceedingly difficult to store and/or transport the same without utilizing specialized equipment or facilities. In many instances, users are forced to disassemble the vehicles for storage and transport.

Accordingly, it would be beneficial to provide a heavy lift UAV frame which can be mated with any type of avionics and/or payload package, and that does not suffer from the drawbacks described above.

SUMMARY OF THE INVENTION

The present invention is directed to a heavy-lift UAV frame. One embodiment of the present invention can include a central frame portion having a symmetrical shape and forming a pocket area for receiving an avionics package. A top and bottom plate can be secured to the central frame portion and can include four corner members extending diagonally outward therefrom.

Another embodiment of the present invention can include a plurality of boom arms that are connected to each of the corner members. Each of the boom arms can be pivotally connected to the corner members and can transition between an extended position for flight and a retracted position for storage and transport. Each boom can preferably include a complementary dimension to one side of the central frame portion so as to be arranged parallel thereto when in the retracted position.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1A:
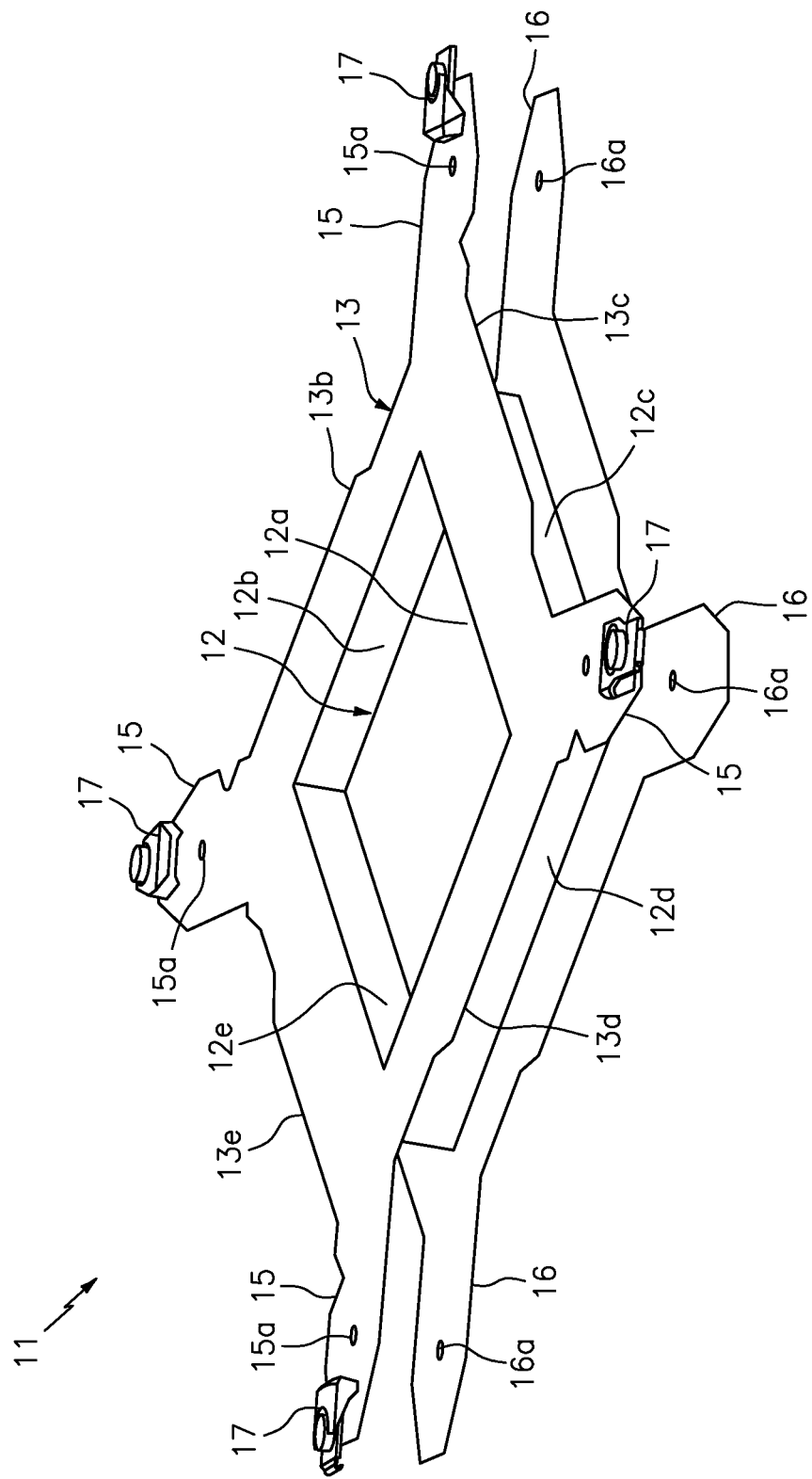
FIG. 1A is a perspective view of the top side of the central frame portion that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As described throughout this document, the term "complementary dimension," shall be used to describe a situation wherein an object includes a size that is identical to, or substantially identical to the size of another component, in terms of length, and/or width, and/or height, for example.

As described herein, the term "removably secured," "removably engaged" and derivatives thereof shall be used to describe a situation wherein two or more objects are joined together in a non-permanent manner so as to allow the same objects to be repeatedly joined and separated. This can be accomplished through the use of any number of commercially available connectors such as opposing strips of hook and loop material (i.e. Velcro®), magnetic elements, and compression fittings such as hooks, snaps and buttons, for example.

As described herein, the term "pivotally connected," "rotatably secured" and all derivatives shall be used interchangeably to describe a situation wherein two or more objects are joined together in a manner that allows one or both of the objects to pivot and/or rotate about or in relation to the other object along one or more axes. Several nonlimiting examples include traditional single hinge mechanisms, pivoting couplers and/or swivel flanges, for example. Alternatively, or in conjunction with the above noted devices, the objects can be rotatably connected via a dual axis hinge capable of providing both rotational movement (e.g., yaw) and pivotal movement (e.g., along one plane/linear). One suitable dual axis hinge is described in U.S. Pat. No. 7,979,960, the contents of which are incorporated herein by reference.

FIGS. 1A-3C illustrate one embodiment of heavy lift UAV frame 10 that is useful for understanding the inventive concepts disclosed herein. As shown, the device 10 can include, essentially a main body 11 having a plurality of booms 21 that are pivotally secured thereon.

Figure 1B:
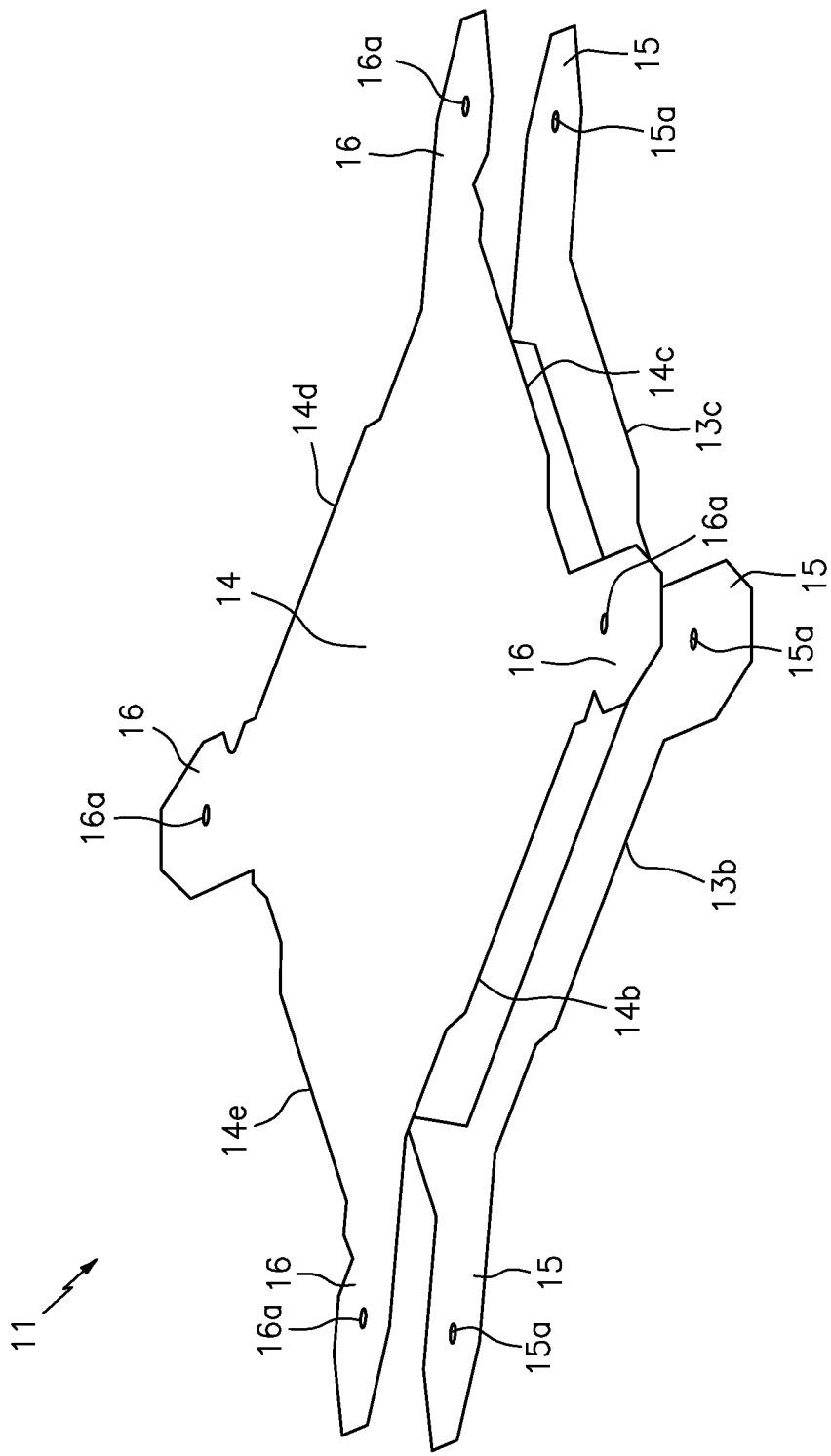
FIG. 1B is a perspective view of the bottom side of the central frame portion, in accordance with one embodiment of the invention.

As shown best in FIGS. 1A and 1B, the main body 11 can include a generally square shaped central body portion 12 for receiving and storing any type of avionics. As such, the central body portion can include a recessed bottom wall 12a and a plurality of raised side walls 12b, 12c, 12d, and 12e. By encircling the delicate avionics within the rigid frame members of the central body portion 12, the main body 11 advantageously forms a pocket area that can protect and shelter the delicate components from being directly impacted by another object in the event of a crash.

The main body can also include a top plate 13 having edges 13b, 13c, 13d and 13e, and a bottom plate 14 having edges 14b, 14c, 14d and 14e. Top and bottom edges 13b-13e and 14b-14e being arranged so as to extend outward from the central walls 12b-12e, respectively. As shown, each of the top and bottom plates can also include corner members 15 and 16, respectively, which extend diagonally outward from the central portion 12. The distal ends of the top and bottom corner members can include apertures 15a and 16a, respectively, that are aligned vertically so as to receive the below described boom arm 20. Additionally, each of the top corner members 15 can further include a latching mechanism 17, such as the illustrated draw latches, for example, along the top surface thereof.

In the preferred embodiment, the main body 11 can be constructed from a lightweight and sturdy material such as aluminum, for example, however other construction materials such as plastic, carbon fiber and other forms of composite materials are also contemplated. The central body portion 12, the top plate 13 and the bottom plate 14 can be constructed from identical or different materials and can be secured together in any number of commercially known manners.

Figure 2:
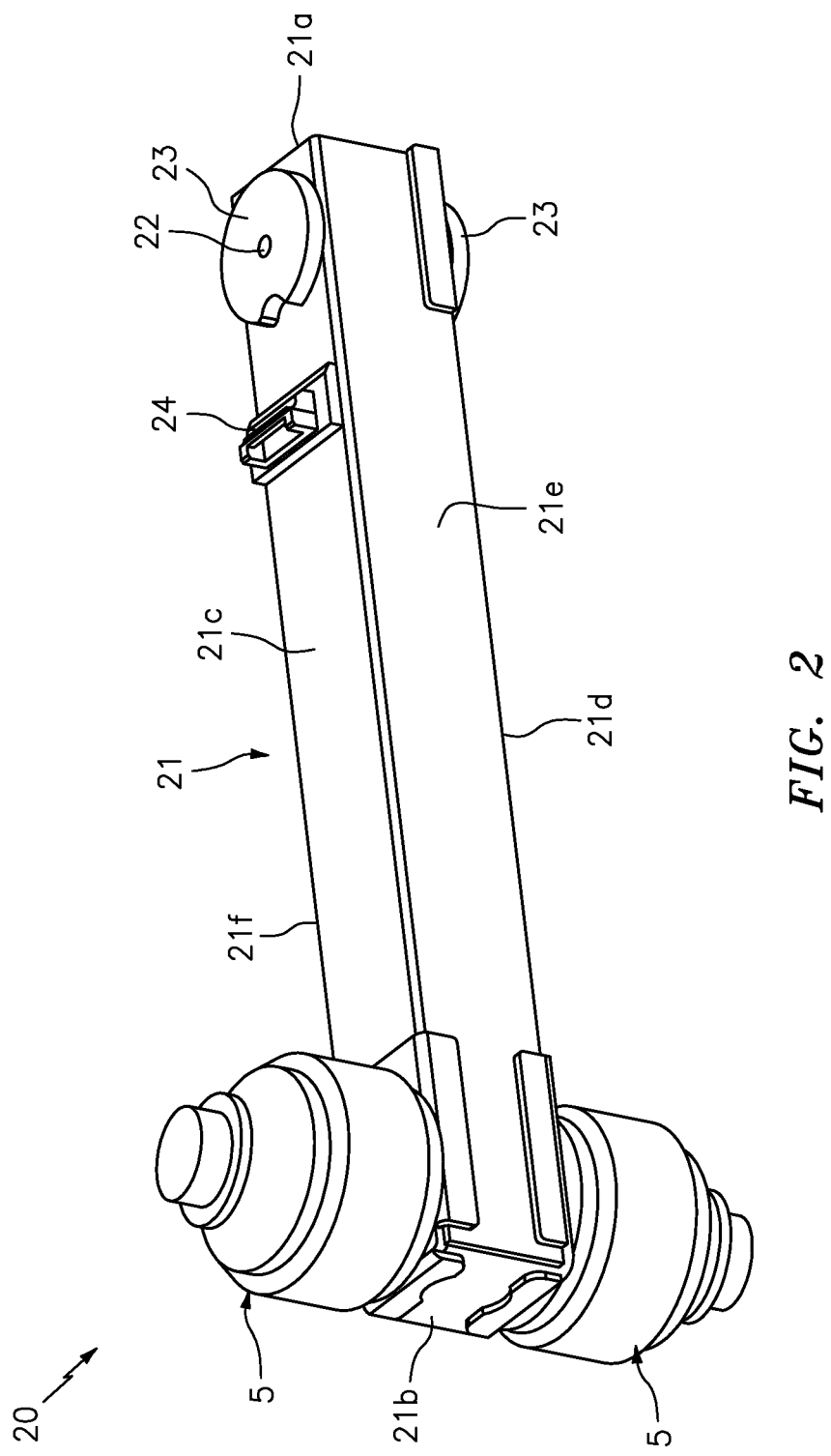
FIG. 2 is a perspective view of a boom arm of the heavy-lift UAV frame, in accordance with one embodiment of the invention.

FIG. 2 illustrates one embodiment of a boom arm 20 which can be pivotally secured onto each corner of the main body. As shown, the boom can include an arm member 21 that is preferably in the shape of a hollow square tube, having a first end 21a, a second end 21b a top surface 21c a bottom surface 21d and a pair of side surfaces 21e and 21f. The second end of the boom arm 21b can function receive and securely position a pair of electric engines 5 along both the top and bottom surfaces thereof. When such engines are installed, the engine control cables (not illustrated) can be routed through the hollow portion of the arm for connection to an avionics package located on the main body 11.

In one embodiment, the first end of the boom arm 21a can include a pair of washers 23 along the top and bottom surfaces and an aperture 22 can extend through each of the washers and the boom arm. Likewise, a raised bracket member 24 can be positioned along the top surface of the boom arm 21c at a location adjacent to the washer. The bracket can work in conjunction with the above described latch 18 in order to secure and lock the boom in the extended position when the device is in use.

Figure 3A:
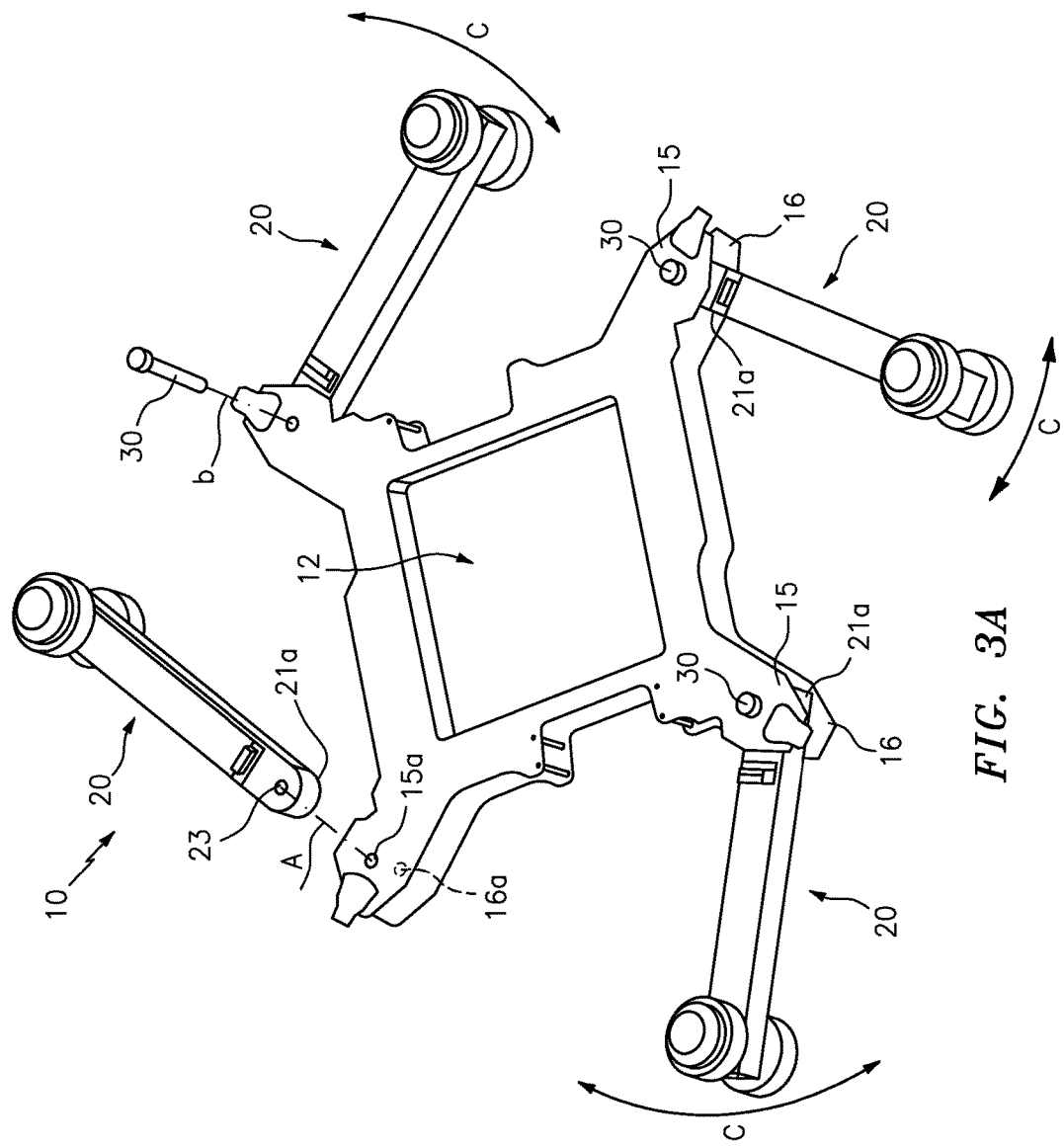
FIG. 3A is an exploded parts view of the heavy-lift UAV frame, in accordance with one embodiment of the invention.
Figure 3B:
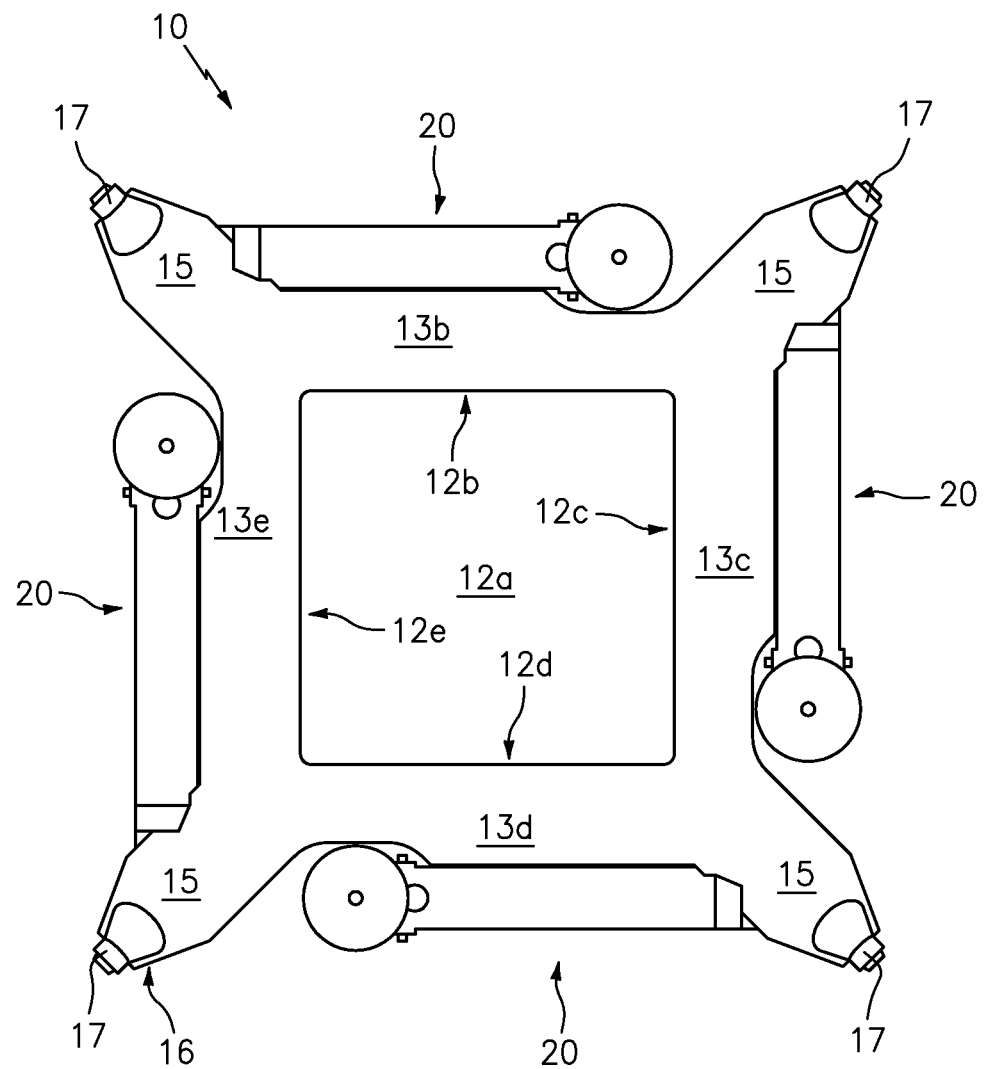
FIG. 3B is a perspective view of the heavy-lift UAV frame in the retracted position, in accordance with one embodiment of the invention.
Figure 3C:
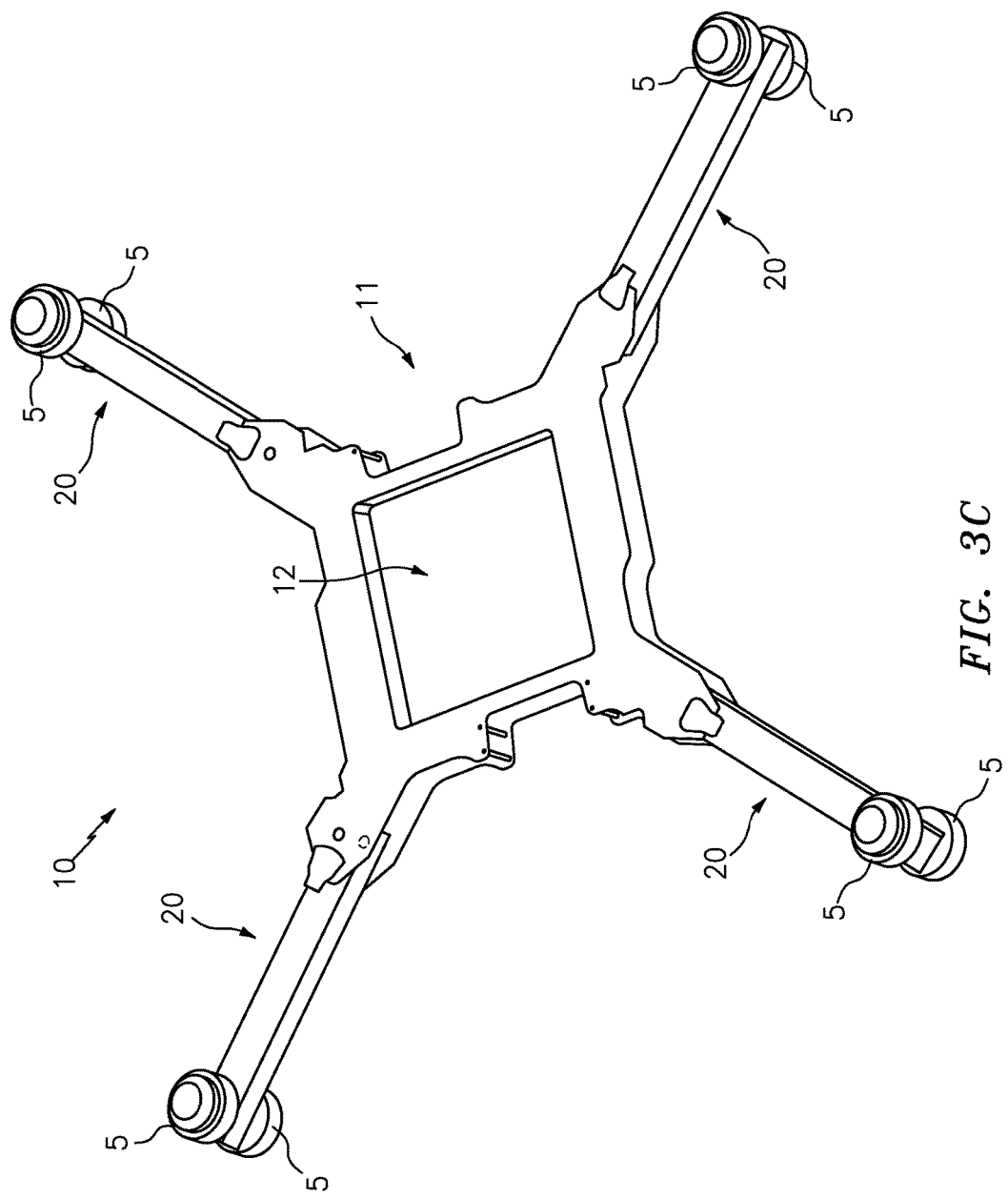
FIG. 3C is a perspective view of the heavy-lift UAV frame in the extended position, in accordance with one embodiment of the invention.

As shown in FIGS. 3A-3C, the heavy-lift UAV frame 10 can include four boom arms 20 which can be pivotally secured onto the corner of the main body. As shown best in FIG. 3A, the first end of each boom arm 21a can be positioned between the corner members 15 and 16 (See arrow a) until the apertures 23, 15a and 16a are aligned vertically. At this time, a locking pin 30 or other such member can be inserted (See arrow b) through the aligned apertures so as to prevent inadvertent separation of the boom arm from the frame. When so positioned, each boom arm can pivot between a fully extended position and a fully retracted position.

As shown in FIG. 3B, each boom arm 20 can include a length (e.g., distance between the first end 21a and the second end 21b) that is complementary to the length of one side of the central body walls 12b-12e and/or edges 13b-13e and 14b-14e. This dimension, combined with the symmetrical square shape of the central body portion, advantageously allows the assembled frame 10 to transition to a fully retracted position, wherein each boom arm 20 can be pivoted until it is located parallel with one side of the central body portion 12b-12e and/or edges 13b-13e and 14b-14e, respectively. When so positioned, the corner members 15 and 16 will be the outermost components of the frame. Such a design advantageously allows the sturdy corner members to protect the boom arms against impacts with foreign objects when the frame member is retracted for storage and/or transport.

FIG. 3C illustrates one embodiment of the frame 10 in the fully extended position, wherein each of the boom arms are extending outward from the corner of the main body and are locked in place by the latch 18 and bracket 24. As each of the boom arms 20 includes a length that is complementary to the length of each of the side walls of the central body portion 12, the frame remains completely symmetrical from each side when fully extended. Such a feature eliminates much of the vibrations that are experienced by non-symmetrical devices as the boom arms 20 maintain each engine 5 at a uniform distance from each other and the payload/avionics being carried by the central portion of the frame 12.

Although dimensions are not critical, in the preferred embodiment, the main body 11 can preferably include a diagonal length between each corner section of approximately 30 inches. Likewise, each boom 20 can preferably include a length of approximately 24 inches from end to end. Such dimensions being suitable for allowing each boom to support two engines having 32 inch propellers giving the frame a lifting capacity of over 1,000 pounds. Of course, other sizes are also contemplated.

As described herein, one or more elements of the heavy-lift UAV frame 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A UAV frame, comprising:
   a symmetrical-shaped central body portion,
   a top plate that is secured along a top portion of the central body portion, wherein the top plate comprises a plurality of top corner members extending diagonally outward from the central body portion;
   a bottom plate that is secured along a bottom portion of the central body portion, wherein the bottom plate comprises a plurality of bottom corner members extending diagonally outward from the central body portion; and
   a plurality of elongated boom arms, each of said boom arms including a first end that is pivotally connected to one of the plurality of top corner members along a top surface, and one of the plurality of bottom corner members along a bottom surface,
   wherein each of the plurality of boom arms are configured to pivot between a retracted position and an extended position,
   wherein the plurality of top corner members and the plurality of bottom corner members are outermost components of the frame when each of the plurality of boom arms are in the retracted position.

2. The frame of claim 1, wherein each of the plurality of top corner members further includes a latching mechanism that is disposed along a distal end thereof.

3. The frame of claim 2, wherein each of the plurality of elongated boom arms further includes a bracket that is disposed along the top surface at a location adjacent to the first end, said bracket and latching mechanisms being configured to be removably engaged so as to lock the frame into the extended position.

4. The frame of claim 1, wherein the symmetrical-shaped central body portion includes a square shape having a bottom wall and four side walls, each of said side walls including identical dimensions.

5. The frame of claim 4, wherein each of the plurality of boom arms includes a dimension that is complementary to a dimension of one of the four side walls of the central body portion, and
   each of the plurality of boom arms are positioned parallel to one of the four side walls of the central body portion when the frame is in the retracted position.

6. The frame of claim 4, wherein the bottom wall is positioned along a bottom edge of each of the side walls forming a pocket area for receiving avionics.

7. The frame of claim 6, wherein the plurality of top and bottom corner members consist of:
   four pairs of top and bottom corner members, each pair having a single top corner member and a single bottom corner member that are positioned parallel to the other.

8. The frame of claim 7, wherein the plurality of boom arms consists of:
   four identical boom arms, each including a dimension that is complementary to a dimension of one of the four side walls of the central body portion, and being positioned parallel to one of the four side walls of the central body portion when the frame is in the retracted position.

9. The frame of claim 1, wherein the plurality of top corner members and the plurality of bottom corner members are outermost components from the center of the frame when each of the plurality of boom arms are in the retracted position.

10. A UAV frame, comprising:
    a symmetrical-shaped central body portion,
    a top plate that is secured along a top portion of the central body portion, wherein the top plate comprises a plurality of top corner members extending diagonally outward from the central body portion;

a bottom plate that is secured along a bottom portion of the central body portion, wherein the bottom plate comprises a plurality of bottom corner members extending diagonally outward from the central body portion; and a plurality of elongated boom arms, each of said boom arms including a first end that is pivotally connected to one of the plurality of top corner members along a top surface, and one of the plurality of bottom corner members along a bottom surface, wherein each of the plurality of boom arms are configured to pivot between a retracted position and an extended position;

wherein two adjacent top corner members and two adjacent bottom corner members are positioned to protect at least one boom arm against impact when the at least one boom arm is in the retracted position.

\* \* \* \* \*